Figure 1:
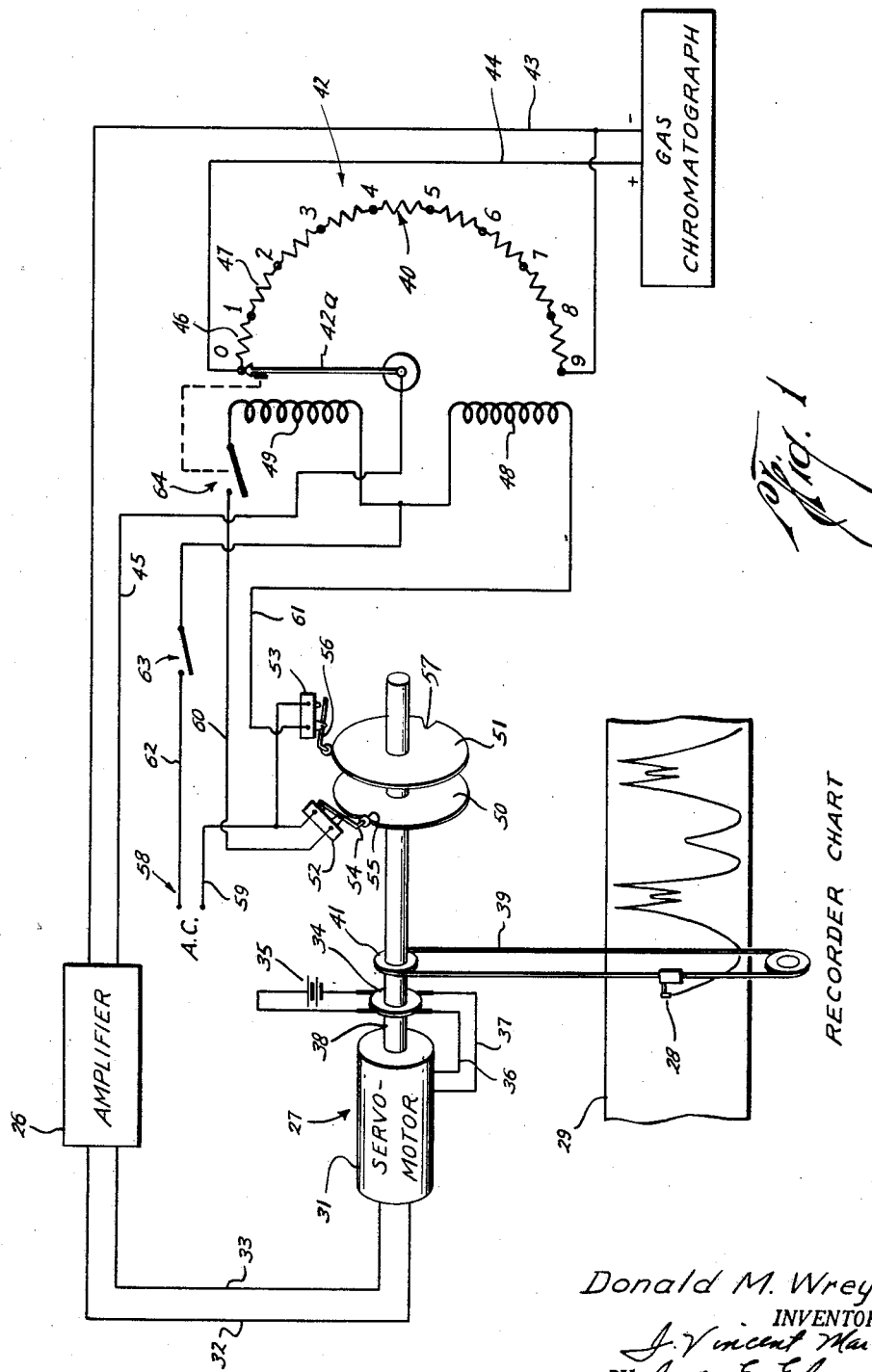

Dec. 25, 1962 D. M. WREYFORD 3,070,797
ATTENUATOR
Filed April 8, 1959 2 Sheets-Sheet 1

Donald M. Wreyford
INVENTOR.
BY J. Vincent Martin
Joe E. Edwards
M. H. Gay
ATTORNEYS Dec. 25, 1962     D. M. WREYFORD     3,070,797
ATTENUATOR Filed April 8, 1959     2 Sheets-Sheet 2

Donald M. Wreyford
INVENTOR.

BY
ATTORNEYS

United States Patent Office 3,070,797
Patented Dec. 25, 1962

3,070,797
ATTENUATOR
Donald M. Wreyford, Houston, Tex., assignor, by mesne assignments, to Sinclair Research, Inc., a corporation of Delaware
Filed Apr. 8, 1959, Ser. No. 804,949
6 Claims. (Cl. 346—32)

This invention relates to signal recording apparatus, and more particularly to an attenuated signal recording apparatus.

In many instances, it is desirable to record a signal which may vary over an extremely large range. If the full range to be recorded is plotted on a conventional size chart, the instrument is insensitive when recording signals of small magnitude.

It has been conventional in instances of this sort to provide instruments which may have their sensitivity range varied manually.

A particular field in which this problem is present is that of gas chromatography. In this field readings are traced on charts of conventional width by manually varying the sensitivity of the instrument. It should be noted that in this field computations are made depending not only upon the magnitude of the recorded signal, but also upon the width of the trace at one-half of the signal's peak magnitude. Thus, the signal must be attenuated in such a manner that a measurable signal is present both for peak magnitude and width at one-half of peak magnitude.

It is an object of this invention to provide an automatically attenuated recorded for recording signals which vary over a wide range and which permit determination of the peak magnitude of the signal and the width of the trace at one-half of the signal's peak magnitude.

Another object is to provide an automatically attenuated recording device which is very simple and rugged in construction.

Another object is to provide an automatically attenuated recording device in which over-travel of the pen when changing scale does not affect the sensitivity or speed of operation of the recorder.

Another object is to provide an automatically attenuated recorder which scribes with a single pen in such a manner as to indicate the number of times the signal has been attenuated.

Another object is to provide an automatically attenuated recorder which may be used in gas chromatography without the constant attendance of an operator, and which permits direct reading from the chart of the magnitude of a signal and the width of the trace at one-half of the signal's peak magnitude.

Other objects, features and advantages of this invention will be apparent from the drawings, the specification and the claims.

Figure 2:
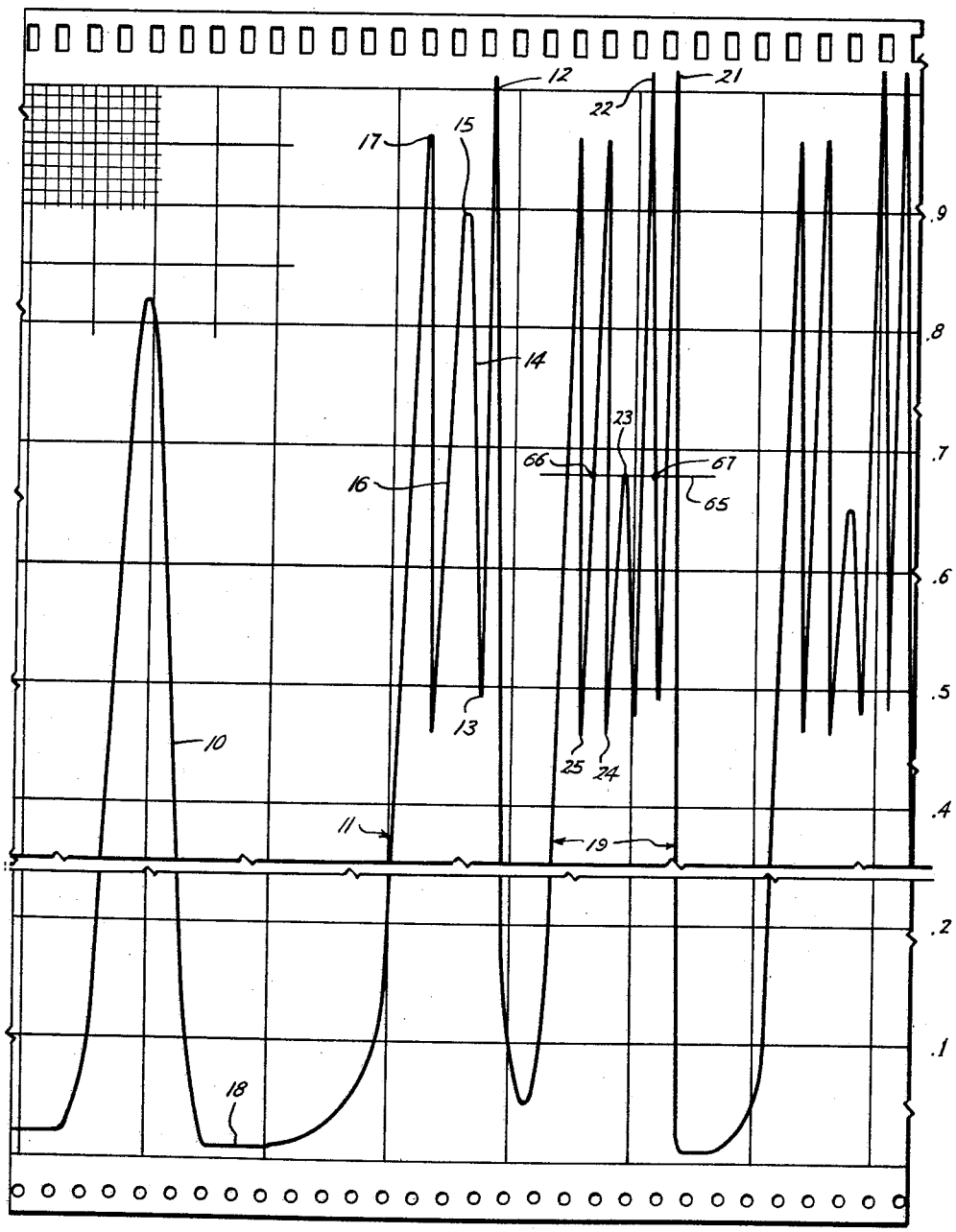

In the drawings wherein there is shown an illustrative embodiment of this invention:

FIGURE 1 is a schematic illustration of a device constructed in accordance with this invention; and FIGURE 2 is a view of a fragment of a chart made by the device of FIGURE 1.

This invention is characterized by reducing and increasing the signals fed to the pen motor binarily. The reduction of an increase in signal is preferably carried out at approximately the point when the pen reaches full scale and, as the reduction is binary, the increase in signal during the period when a signal is decreased is carried out at approximately one-half of full scale.

Referring to FIGURE 2, it will be noted that the signal recorded at 10 was of a magnitude less than full scale, and therefore the signal was not attenuated. Its peak may be read directly from the chart and the time interval or width of the trace at one-half of peak magnitude may be read directly. The signal indicated generally at 11 was of such magnitude that if not attenuated it would have run off the chart, and was attenuated by the device shown in FIGURE 1. When the pen reached approximately full scale position at 12, the signal was reduced binarily to one-half of its then value. The device of FIGURE 1 then returned the pen to approximately the half scale position 13. Inasmuch as the signal has been reduced by one-half, the pen line 14 represents a magnitude of signal which is twice the scale reading. The peak signal is represented at 15 and thereafter the signal decreased as represented by pen line 16. Upon pen line 16 reaching approximately one-half scale, the device of FIGURE 1 multiplied the signal binarily and, its magnitude being immediately doubled, moved the pen to full scale position as shown at 17. Thereafter, the signal reduced to the position 18, at which time a second signal began to be received as indicated at 10. As shown in the signal 19, the signal received may be attenuated binarily several times, depending upon the range of the instrument. In the signal 19, the line terminating at 21 represents the signal strength received. The line terminating at 22 represents the signal strength received reduced by a factor of 2. The line terminating in peak 23 represents the signal strength decreased by a factor of 4. The line terminating in the peak 24 represents the reducing signal to the factor of 4, and the line terminating in the peak 25 represents the reducing signal to the factor of 2. Of course, if the signal had been further attenuated, the additional peaks would have increased and decreased binarily.

Reference is now made to FIGURE 1 in which there is shown a preferred form of device for producing the chart shown in FIGURE 2. The input to the chart is a varying electrical potential or signal which may be provided by any desired apparatus which is utilized in measuring varying conditions. In the illustrated embodiment the signal is received from a gas chromatograph. One well known form of chromatograph utilizes a Wheatstone bridge having two variable legs, one of which is varied by a reference medium and the other of which is varied by the gas being analyzed. The difference in potential between these two legs is fed to the recorder. The chromatograph, its operation and manner of producing a difference in potential for feeding to a recorder are well known to those skilled in the art and, therefore, has not been illustrated in detail in the drawings.

The signal from the gas chromatograph is amplified in amplifier 26 and fed to the pen operating means indicated generally at 27. The pen operating means is of the type which reciprocates the pen 28 transversely across chart 29 in proportion to the signal received by the pen operating means. Thus, as signal intensity increases the pen moves toward full range, and as signal intensity decreases the pen moves toward minimum range.

Preferably the pen operating means includes a servo-motor 31 having multiple windings, with one winding receiving the signal from the amplifier 26 through conduits 32 and 33. The other winding of the servo-motor is controlled by a master which generates a varying signal according to the rotative position of the servo-motor 31. With this arrangement a servo-motor will always seek a position in which the force exerted by the winding controlled directly by the master is equal to the force exerted by the winding receiving the signal from the amplifier 26.

Preferably the master is a slide potentiometer 34 provided with a standard potential by battery 35. The potentiometer 34 is connected to a winding of the servo-motor through conduits 36 and 37. The slide wire of the potentiometer is non-rotatably mounted on the arbor 38 of the servo-motor and varies the output of the potentiometer 34 in accordance with the rotative position of arbor 38. Thus, when the signal from the amplifier is larger or smaller than the signal from the potentiometer, the arbor of the servo-motor will be rotated until the potentiometer signal is equal to the amplifier signal. This rotation will be transmitted through the pulley wire 39 which carries pen 28 and which is rotated by a pulley 41 also mounted on the servo-motor arbor 38.

In accordance with this invention, the signal from the amplifier is reduced binarily upon the arbor 38 rotating to a predetermined position at which the pen 28 is at full scale. Preferably, the signal is reduced by interposing a stepping switch or relay in the incoming circuit to the amplifier 26. This stepping switch or relay is indicated generally at 42 and is interposed in one leg of the circuit receiving the signal from the gas chromatograph. In the illustrated embodiment, line 43 is connected directly to the amplifier and line 44 feeds to the stepping relay. The output of the stepping relay is fed to the amplifier through line 45.

The stepping relay divides or reduces the incoming signal binarily. The stepping relay includes a resistance 40 which is connected in line 43 to provide a potential across lines 43 and 44 when the gas chromatograph is generating a signal. By moving the contact 42a of the relay along the resistance, the voltage of the signal passing through the contact may be varied to vary the current flowing through the amplifier. At the zero contact of the stepping relay the full potential signal is fed to the pen operating means. Upon stepping of the stepping relay to contact 1, the section 46 of the resistance divides the voltage in half which divides the current in half. Upon stepping of the stepping relay to contact 2, the voltage is again divided in half by the combined action of portions 46 and 47 of the resistance. In like manner, the voltage may be reduced binarily by continued stepping of the stepping relay. Of course, reverse action of the stepping relay will increase the voltage binarily.

The step relay 42 is of the type which is stepped in a direction to reduce the incoming signal by energizing coil 48 and in a direction to increase the signal by energizing coil 49.

The step relay control coils 48 and 49 are controlled in response to the position of pen 28 to divide the signal each time the pen moves to full range position in response to an increasing signal, and to multiply the signal each time the pen moves from full range position to half range position until the full input signal is fed to the amplifier 26. Such control may conveniently be provided by means associated with the arbor 38 in the manner illustrated in the drawing. The arbor has nonrotatably secured thereon a pair of cam discs 50 and 51. Microswitches 52 and 53 are associated with the cams 50 and 51 and are rotatably positioned about the axis of rotation of arbor 38 so that when the actuating arm 54 of microswitch 52 falls in the cam indentation 55 of cam 50 the pen 28 is at one-half scale position. When the actuating arm 56 of microswitch 53 falls in the cam indentation 57 of cam 51, the pen 28 is at the full range position.

A source of power for the relay 42 may be provided from any convenient source, such as the alternating current source indicated generally at 58. One lead from the incoming power is fed through line 59 to microswitches 52 and 53 in parallel. A line 60 connects microswitch 52 with coil 49 and a line 61 connects microswitch 53 with coil 48. Both coils are connected to the source of power through line 62. If desired, a manual switch indicated generally at 63 may be provided in the circuit. A second switch indicated generally at 64 is preferably mechanically linked to the stepping relay as indicated by the dashed line so that the switch 64 is open when the stepping relay is in zero position, and automatically closes when the stepping relay is in any position other than the zero position. Switch 64 prevents energizing of the stepping relay coil 49 when a full strength signal is being fed to motor 31.

In operation, the incoming signal passes through the stepping relay to amplifier 26 and the amplified signal is fed to the servo-motor 31. The slide potentiometer 34 being energized by battery 35 with a standard potential controls the servo-motor. As a signal is received by the servo-motor the motor is rotated until the slide wire of the slide potentiometer is positioned to provide an output from the slide potentiometer which is equal to the output of the amplifier, and in this manner the servo-motor is controlled. As the signal increases in strength the motor arbor 34 will be rotated to a position at which pen 28 is at maximum scale position. At this time the actuating arm 56 of the microswitch 53 closes the microswitch and actuates coil 48 to step the stepping relay from the zero to the No. 1 position. When this occurs the incoming signal from the gas chromatograph is divided by two, and therefore the signal to the servo-motor is divided by two. This reduced signal to the servo-motor causes it to rotate in a reverse direction to move the pen 28 immediately to one-half scale position. Thereafter the incoming signal passes through the stepping relay as before, but the signal to the amplifier is reduced binarily so that the pen is now moved toward full scale position by an increase in incoming signal from the chromatograph, but with the effect of the incoming signal being divided by two. In other words, the rotation of the servo-motor being proportional to the signal received, it will require an increase in incoming signal to the amplifier which is equal in magnitude to that received before the stepping relay was tripped to move the pen to a full scale position again. At this time, the stepping relay is again tripped to binarily reduce the incoming signal. The cycle is repeated with continued binary reduction of the incoming signal until the full magnitude of the incoming signal is reached and measured.

At this time the magnitude of the signal will begin to reduce. As the input signal to the servo-motor will be reducing, it will begin to rotate from the full scale toward the half scale position. Upon the pen reaching the half scale position, the microswitch 52 is closed to energize coil 49 and reduce the stepping relay one position. This causes a binary increase in the signal fed to the servo-motor which returns the pen to full scale position. Thereafter the incoming signal reduces and the stepping coil is stepped progressively toward zero position until the zero position is reached. During this time the pen moved between full scale and half scale position. Upon the stepping relay reaching the zero position, the switch 64 is open. With switch 64 open the pen may cross the half scale position without operating the stepping relay. Of course, at this time the full signal is passing to the amplifier and the pen will return to the zero position as the magnitude of the signal is reduced to zero. To avoid improper actuation of the switches due to overrun of the pen, the midpoint switch may be set to close with the pen slightly below midpoint. In like manner, the full scale switch may be slightly above full scale.

Referring now to the chart of FIG. 2, it will be noted that the chart is scaled in 100 units. Therefore, the midscale position is 50 units. In reading the magnitude of the signal recorded, the scale is read directly where the signal has not been attenuated as in the case of signal 10. In reading a signal such as 11, we know that the signal was attenuated one time and, therefore, the peak 12 indicates that 100 units had been recorded before attenuation and the peak 15 indicates that 90 less 50, or 40, units were recorded at a factor of 2. Applying the factor to the attenuated units, we have 2×40=80. Adding this to the unattenuated units, we have a total signal of 180. The signal 19 is 100 indicated by the peak 21, plus 100 indicated by the peak 22, plus 72 (4×18), or a total of 272.

In reading the width of the trace at one-half its maximum magnitude, we find that one-half of the maximum amplitude is the width of the shell of the signal at the height of maximum amplitude and across the shell of the signal before its last attenuation. Therefore, we may draw a line 65 across the signal which extends horizontally through peak 23. Then measuring from point 66 to point 67 we have the width of the trace at one-half of maximum magnitude.

From the above it will be seen that there has been provided a very simple apparatus for attenuating a signal which permits the ready determination of the magnitude of the signal and also permits a determination of the width or time during which the signal was received at one-half of the maximum magnitude of the signal.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus for recording a signal which varies in intensity between wide limits comprising, a chart, means for moving the chart at a constant rate, a pen cooperable with the chart to record a trace thereon, reversible motor means for moving the pen back and forth across the chart in proportion to the intensity of a signal, a circuit receiving the signal to be recorded and feeding it to said motor, and means including a binary signal increasing and decreasing means operable in response to movement of said motor means in one direction to a predetermined point for reducing said signal binarily and operable in response to movement of said motor means in the other direction to a second predetermined point for increasing a previously reduced signal binarily.

2. Apparatus for recording a signal which varies in intensity between wide limits comprising, a chart, means for moving the chart at a constant rate, a pen cooperable with the chart to record a trace thereon, motor means for moving the pen back and forth across the chart in proportion to the intensity of a signal, a circuit receiving the signal to be recorded and feeding it to said motor means, a stepping relay in said circuit changing said signal binarily with each step of the relay, switch means operable upon movement of said pen to full range position on the chart due to an increase in the signal received by said circuit to step said stepping relay in a direction to decrease the signal fed to said motor means binarily, and switch means operable upon movement of said pen to one-half range due to a decrease in the signal received by said circuit to step said stepping relay in a direction to increase said signal binarily with each movement of the pen from full range to half range until the full signal received by said circuit is fed to said motor means.

3. Apparatus for recording a signal which varies in intensity between wide limits comprising, a chart, means for moving the chart at a constant rate, a pen cooperable with the chart to record a trace thereon, a multiple winding electric motor for moving the pen back and forth across the chart, a circuit receiving the signal to be recorded and feeding it to one winding of said motor, a slide potentiometer controlled by the output of said motor and supplying a signal to another winding of said motor, means for applying a standard potential to said potentiometer whereby said motor will always seek a position in which said two signals are equal, a circuit receiving the signal to be recorded and feeding it to said motor, means including a binary signal multiplier and divider operable in response to movement of said motor means in one direction to a predetermined point for reducing said signal binarily and operable in response to movement of said motor means in the other direction to a second predetermined point for increasing the previously reduced signal binarily.

4. Apparatus for recording a signal which varies in intensity between wide limits comprising, a chart, means for moving the chart at a constant rate, a pen cooperable with the chart to record a trace thereon, a multiple winding electric motor for moving the pen back and forth across the chart, a circuit receiving the signal to be recorded and feeding it to one winding of said motor, a slide potentiometer controlled by the output of said motor and supplying a signal to another winding of said motor, means for applying a standard potential to said potentiometer whereby said motor will always seek a position in which said two signals are equal, a stepping relay in said circuit changing said signal binarily with each step of the relay, switch means operable upon movement of said pen to full range position on the chart due to an increase in the signal received by said circuit to step said stepping relay in a direction to decrease the signal fed to said motor means binarily, and switch means operable upon movement of said pen to one-half range due to a decrease in the signal received by said circuit to step said stepping relay in a direction to increase said signal binarily with each movement of the pen from full range to half range until the full signal received by said circuit is fed to said motor means.

5. Apparatus for recording a signal which varies in intensity between wide limits comprising, a chart, means for moving the chart at a constant rate, a pen cooperable with the chart to record a trace thereon, a multiple winding electric motor for moving the pen back and forth across the chart, a circuit receiving the signal to be recorded and feeding it to one winding of said motor, a slide potentiometer controlled by the output of said motor and supplying a signal to another winding of said motor, means for applying a standard potential to said potentiometer whereby said motor will always seek a position in which said two signals are equal, a stepping relay in said circuit changing said signal binarily with each step of the relay, first and second cams carried by the arbor of said electric motor, and first and second switches operable by said cams at spaced rotative positions of the arbor of said electric motor, said first switch operating said stepping relay in a direction to decrease the signal fed to said motor means, said second switch operating said stepping relay to increase said signal until the full signal received by said circuit is fed to said motor means.

6. The apparatus of claim 5 wherein a switch is opened in the second switch circuit by said stepping relay when said relay is in zero position.

References Cited in the file of this patent

UNITED STATES PATENTS

| 1,784,522 | Harrison | Dec. 9, 1930 |
| 1,930,496 | Wilson et al. | Oct. 17, 1933 |
| 2,457,214 | Doll et al. | Dec. 28, 1948 |
| 2,470,745 | Schlesman | May 17, 1949 |
| 2,637,619 | Stein | May 5, 1953 |
| 2,673,136 | Stein et al. | Mar. 23, 1954 |
| 2,755,432 | Arps et al. | July 17, 1956 |